United States Patent [19]
Tomiyasu

[11] 3,742,762
[45] July 3, 1973

[54] IMPACT-TYPE POWDER/GRANULE FLOW METER

[76] Inventor: Hiroshi Tomiyasu, No. 162-2, Nagao, Kanagawa-ken, Kawasaki, Japan

[22] Filed: Apr. 1, 1971

[21] Appl. No.: 130,233

[52] U.S. Cl. ................................................. 73/228
[51] Int. Cl. ............................................. G01f 1/00
[58] Field of Search ...................................... 73/228

[56] References Cited
UNITED STATES PATENTS

| | | | |
|---|---|---|---|
| 3,429,181 | 2/1969 | Kamekichi Siba | 73/228 |
| 1,249,484 | 12/1917 | Pogue | 73/228 |
| 3,212,330 | 10/1965 | De Pollier | 73/228 |
| 3,232,486 | 2/1966 | Ofner | 73/228 X |
| 3,304,773 | 2/1967 | Rogallo | 73/170 X |
| 3,439,761 | 4/1969 | Laimins | 177/211 |
| 3,557,616 | 1/1971 | Landon, Jr. et al. | 73/228 |
| 3,640,135 | 2/1972 | Tomiyasu et al. | 73/228 |

FOREIGN PATENTS OR APPLICATIONS 804,211  12/1958  Great Britain .................. 73/228

Primary Examiner—Herbert Goldstein
Attorney—Steinberg & Blake

[57] ABSTRACT

Impact-type powder/granule flow meter characterized in that a detecting plate is supported by parallel linkage means for constraining the plate to move only a vertical direction.

3 Claims, 4 Drawing Figures

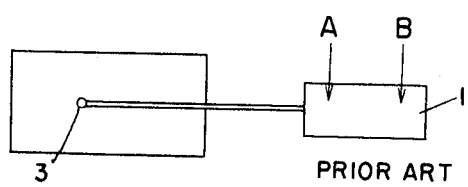
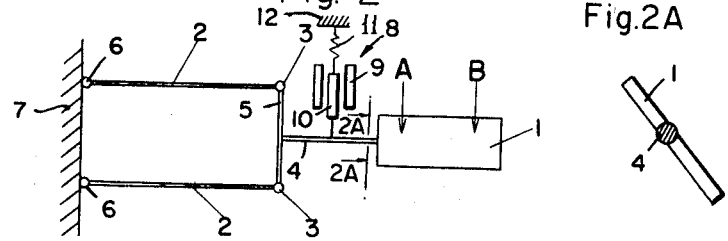
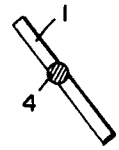
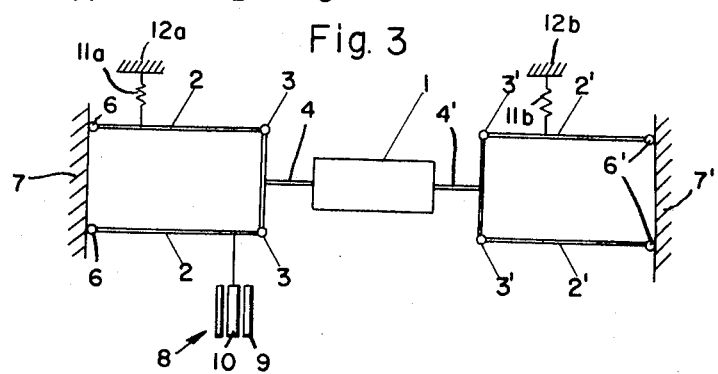

IMPACT-TYPE POWDER/GRANULE FLOW METER

SUMMARY OF THE INVENTION:

This invention relates to an impact-type powder/granule flow meter and has for its main object to make an accurate measurement for flow quantity of the powder or granule.

BRIEF DESCRIPTION OF THE DRAWINGS:

FIG. 1 is an illustration explanatory of a conventional impact-type powder/granule flow meter;

FIG. 2 is a schematic illustration of the impact-type powder/granule flow meter in accordance with this invention;

FIG. 2A is a sectional elevation taken along line 2A—2A of FIG. 2 in the direction of the arrows; and FIG. 3 is a view illustrating another embodiment of the present invention.

DESCRIPTION OF A PREFERRED EMBODIMENT:

This invention relates to an impact-type powder/granule flow meter. A conventional flow meter of such type has such a series defect that be measuring of flow rate may not be accurately carried out for the reason that its flow coefficient deviates according to variation of a position where powder/granule to be measured drops down to a detecting plate.

FIG. 1 is an illustration of the conventional system, showing that, even if same impulse force is to be applied onto a detecting plate 1 between when powder/granule dropped onto a position A of the plate and when it did onto a position B, a moment imposed upon a fulcrum 3 would be different in its intensity.

An object of this invention is to eliminate such defect, that is, it has such a structural feature that a detecting plate is supported for parallel movement.

The present invention will be now described in detail with reference to the accompanying drawing showing preferred embodiment thereof. As it appears in FIG. 2, one end of a detecting plate 1 is fixed to an end of a horizontal bar 4 the opposite end of which is fixed to a vertical bar 5. The upper and lower ends of the latter are connected at pivots or fulcrums 3 to a pair of substantially horizontally extending links 2 of a parallelogram linkage. The links 2 are pivotally connected at 6 to the support 7. As may be seen from FIG. 2A, the detecting plate 1 is inclined, as illustrated, so that downwardly falling powder or granules will urge the plate 1 downwardly. As is well known this downward movement is in opposition to a spring force which tends to maintain the detecting plate 1 in a given equilibrium position, and the extent of downward movement is readily measured in a well known manner by way of any suitable transducer. Thus, FIG. 2 illustrates the bar 4 connected to an armature 10 surrounded by a coil 9, so that this structure forms a transducer for detecting the extent of displacement of the plate 1. Such a transducer is shown, for example, in U.S. Pat. No. 3,429,181. In order to resiliently and yieldably resist the downward movement of the plate 1, the end of the armature 10 is illustrated as connected to a spring 11 which in turn is connected to a stationary support 12. The movement of the element against which the granular material is impacted in opposition to the force of the spring is also old and well known, as shown, for example, in U.S. Pat. No. 3,429,181. Accordingly, when powder/granule drops onto the detecting plate 1, it moves in parallel by the beams of parallelogram and fulcrums, so that any point on this plate, e.g. in case powder/granule drops onto a point A or B, the moment applied on each beam will by no means be changed.

The embodiment illustrated in FIG. 3 shows the case where both ends of the detecting plate 1 are, as above-mentioned, supported from both sides with two paired beams of the parallelogram and in such system, even when powder/granule dropped onto the detecting plate 1 imposes a large load on it, the load is evenly distributed by each of both fulcrums 3 and 3' on the beams 2 and 2', so that it is so effective especially in utilizing for a large detecting plate which has to measure a great amount of powder/granule at once. Thus, it will be seen that the detecting plate 1 of FIG. 3 is supported at both ends by a pair of horizontal bars 4 and 4' with the bar 4' being connected to a parallelogram linkage at the right of the plate 1 identical with that of the left and described above, FIG. 3 having the corresponding components of the additional parallelogram linkage indicated by the same reference characters primed. In the embodiment of FIG. 3 springs 11a and 11b are respectively connected to the links 2 and 2' as well as to stationary supports 12a and 12b in order to maintain the equilibrium condition and resist downward deflection of the detecting plate 1. The extent of displacement is measured by a transducer 8 identical with that of FIG. 2 and connected to the lower link 2 of FIG. 3. Thus, as is apparent from the above description, with the present invention the elongated, horizontally extending detecting plate 1 is operatively connected with a parallelogram linkage means which includes at least one parallelogram linkage made up of the vertical support member 7 pivotally connected to the pair of parallel horizontally extending bars 2, which in turn are pivotally connected to the vertically extending bar 5. The horizontally extending bar 4 is fixed to the vertically extending bar 5 to form therewith a T-shaped member the vertical leg 5 of which forms part of the parallelogram linkage while the horizontal leg 4 thereof extends perpendicularly from the vertical leg and is directly fixed to the detecting plate 1.

What we claim is:

1. In an impact-type powder/granule flow meter, an elongated, horizontally extending detecting plate having an upwardly directed inclined surface against which freely falling particles strike for urging the detecting plate downwardly, and parallelogram linkage means operatively connected with said detecting plate for constraining the latter to move only in a vertical direction without tilting so that a change in the location of impact with said plate will not influence the detection of the rate of flow, said parallelogram linkage means including at least one parallelogram linkage composed of a vertical support member, a pair of parallel horizontal bars each pivotally connected at one end to said support member, and a T-shaped member having a vertical leg pivotally connected to said horizontal bars distant from said vertical support member and a horizontal leg extending perpendicularly from said vertical leg and fixed with said detecting plate.

2. The combination of claim 1 and wherein said parallelogram linkage means includes only a single parallelogram linkage situated to one side of said plate and fixed thereto to support the same only for vertical movement.

3. The combination of claim 1 and wherein said parallelogram linkage means includes a pair of said parallelogram linkages respectively situated symmetrically on both sides of said plate and fixed thereto.

* * * * *